United States Patent
Kraeuter et al.

(10) Patent No.: US 9,248,784 B2
(45) Date of Patent: Feb. 2, 2016

(54) TRUCK CROSSBAR ATTACHMENT

(71) Applicant: Yakima Products, Inc., Lake Oswego, OR (US)

(72) Inventors: Charles Kraeuter, Portland, OR (US); Doug Golenz, Littleton, CO (US); Chris Sautter, Portland, OR (US); William Stephens, Longmont, CO (US)

(73) Assignee: Yakima Products, Inc., Lake Oswego, OR (US)

( * ) Notice: Subject to any disclaimer, the term of this patent is extended or adjusted under 35 U.S.C. 154(b) by 87 days.

(21) Appl. No.: 13/855,545

(22) Filed: Apr. 2, 2013

(65) Prior Publication Data
US 2014/0117062 A1    May 1, 2014

Related U.S. Application Data

(60) Provisional application No. 61/640,629, filed on Apr. 30, 2012.

(51) Int. Cl.
*B60R 9/00* (2006.01)
*B60R 9/10* (2006.01)
*B60P 3/40* (2006.01)
(Continued)

(52) U.S. Cl.
CPC ... *B60R 9/00* (2013.01); *B60P 3/40* (2013.01); *B60R 9/10* (2013.01); *B60R 2011/0059* (2013.01)

(58) Field of Classification Search
CPC .............. B60R 9/00; B60R 9/10; B60R 9/06; B60P 3/40
USPC ......... 224/403, 321, 327, 924, 405, 558, 515, 224/324, 556, 567; 296/37.6
See application file for complete search history.

(56) References Cited

U.S. PATENT DOCUMENTS

| | | | | |
|---|---|---|---|---|
| 4,934,572 | A | * | 6/1990 | Bowman et al. ............... 224/558 |
| 5,092,504 | A | * | 3/1992 | Hannes et al. ................ 224/403 |
| 5,118,156 | A | * | 6/1992 | Richard .......................... 296/40 |

(Continued)

OTHER PUBLICATIONS

Thule, 422 Xsporter Product and Features, Jun. 15, 2008, retrieved from internet: http://web.archive.org/web/20080615140107/http://www.thuleracks.com/product.asp?dept_id=75&sku=422, retrieved on Sep. 23, 2013, 1 page.

(Continued)

*Primary Examiner* — Justin Larson
*Assistant Examiner* — Lester L Vanterpool
(74) *Attorney, Agent, or Firm* — Kolisch Hartwell, P.C.

(57) ABSTRACT

A crossbar system for a truck bed and methods of mounting a crossbar system to a truck bed are disclosed. In some examples, the crossbar system may include two towers, each coupling an end portion of a crossbar to a truck bed wall. Each tower may include a crossbar housing having a clamp device for securing the crossbar housing around a selected location along the crossbar, and a coupling mechanism configured to secure the crossbar housing to the truck bed. The crossbar housing may have a ledge portion configured to sit on an upper surface of the truck bed wall. The coupling mechanism may include a hook member configured to removably engage the ledge portion of the crossbar housing; and an over-center lever that is operable between open and closed positions, which may cause a bridge piece to move between unclamped and clamped positions. The coupling mechanism may include a plurality of alternate bridge pieces, each configured to engage a different truck bed rail structure.

5 Claims, 8 Drawing Sheets

(51) Int. Cl.
  *B60R 9/06*     (2006.01)
  *B60R 11/00*    (2006.01)

(56) References Cited

U.S. PATENT DOCUMENTS

| | | | |
|---|---|---|---|
| 5,143,415 A * | 9/1992 | Boudah | 296/3 |
| 5,228,739 A * | 7/1993 | Love | 296/100.02 |
| 5,261,719 A * | 11/1993 | Tucker | 296/100.18 |
| 5,310,238 A | 5/1994 | Wheatley | |
| 5,316,190 A | 5/1994 | Bullock | |
| 5,393,114 A | 2/1995 | Christensen | |
| 5,431,472 A | 7/1995 | Coffland | |
| 5,494,327 A * | 2/1996 | Derecktor | 296/3 |
| 5,527,024 A | 6/1996 | Dysktra | |
| 5,540,475 A * | 7/1996 | Kersting et al. | 296/100.16 |
| 5,611,472 A * | 3/1997 | Miller | 224/403 |
| 5,975,618 A * | 11/1999 | Rippberger | 296/100.18 |
| 6,059,159 A * | 5/2000 | Fisher | 224/403 |
| 6,179,181 B1 * | 1/2001 | Johnson et al. | 224/405 |
| 6,561,556 B2 | 5/2003 | Fuchs | |
| 6,722,541 B1 * | 4/2004 | Aftanas et al. | 224/403 |
| 6,834,786 B2 * | 12/2004 | Hansen | 224/403 |
| 6,971,563 B2 * | 12/2005 | Levi | 224/405 |
| 7,014,236 B2 | 3/2006 | Kerns | |
| 7,296,837 B2 * | 11/2007 | Niedziela et al. | 296/3 |
| 7,419,075 B2 * | 9/2008 | Green | 224/405 |
| 7,464,977 B1 * | 12/2008 | Price | 296/3 |
| 7,497,493 B1 * | 3/2009 | Thiessen et al. | 296/3 |
| 7,530,614 B2 * | 5/2009 | Nichols | 296/3 |
| 7,841,637 B1 | 11/2010 | Jones et al. | |
| 7,878,743 B2 * | 2/2011 | Aftanas | 410/150 |
| 8,157,229 B2 * | 4/2012 | Palermo | 248/231.71 |
| 8,668,125 B2 * | 3/2014 | Williams | 224/405 |
| 2004/0134953 A1 * | 7/2004 | Perez | 224/403 |
| 2008/0100075 A1 * | 5/2008 | Derecktor | 296/3 |
| 2008/0101883 A1 * | 5/2008 | Derecktor | 410/104 |
| 2008/0152452 A1 * | 6/2008 | Green | 410/3 |
| 2009/0026784 A1 * | 1/2009 | Green | 296/3 |
| 2010/0072237 A1 | 3/2010 | Green | |
| 2010/0288808 A1 * | 11/2010 | Marr, Jr. | 224/403 |
| 2011/0139840 A1 * | 6/2011 | Kraeuter et al. | 224/324 |

OTHER PUBLICATIONS

Prorac Systems Inc.,Tonneau Racks, Mar. 3, 2009, retrieved from internet: http://web.archive.org/web/20090330193648/http://www.prorac.com/softtonneau.php, retrieved on Sep. 23, 2013, 2 pages.

Thule, Rack Systems, Apr. 16, 2009, retrieved from internet: http://web.archive.org/web/20090416182828/http://www.thuleracks.com/carrier_multipurpose2.asp?location=5; retrieved on Sep. 23, 2013, 1 page.

De-Sta-Co, De-sta-co Clamps Products, Jun. 12, 2009, retrieved from internet: http://web.archive.org/web/20090612013130/http://www.destaco.com/products.asp?loc=USA&lang=ENG &products=Clamps&Category_1=Straight+Line+Action+Clamps, retrieved on Sep. 23, 2013,16 pages.

Inno, Base System, Apr. 15, 2010, retrieved from internet: http://web.archive.org/web/20100415173639/http://www.innoracks.com/product/base/, retrieved on Sep. 23, 2013, 3 pages.

Tracrac, TracONE Overview and Features, Jul. 18, 2010, retrieved from internet: http://web.archive.org/web/20100718200146/http://www.tracrac.com/pick-up-trucks/tracone, retrieved on Sep. 23, 2013, 1 page.

* cited by examiner

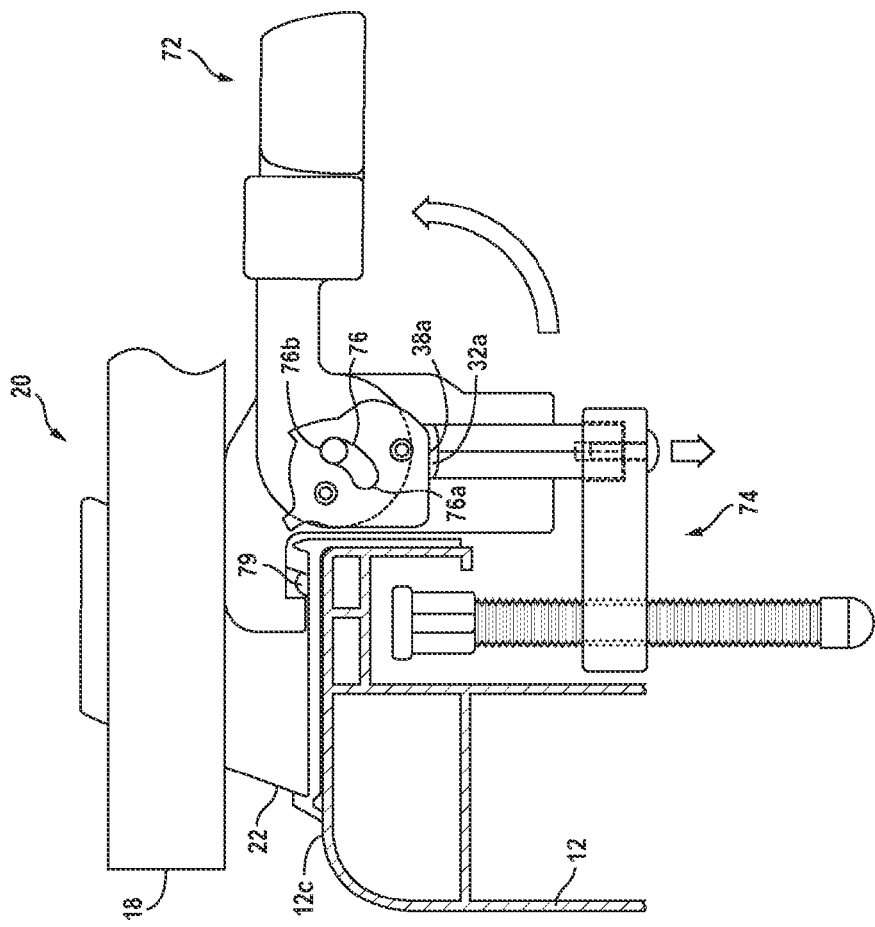
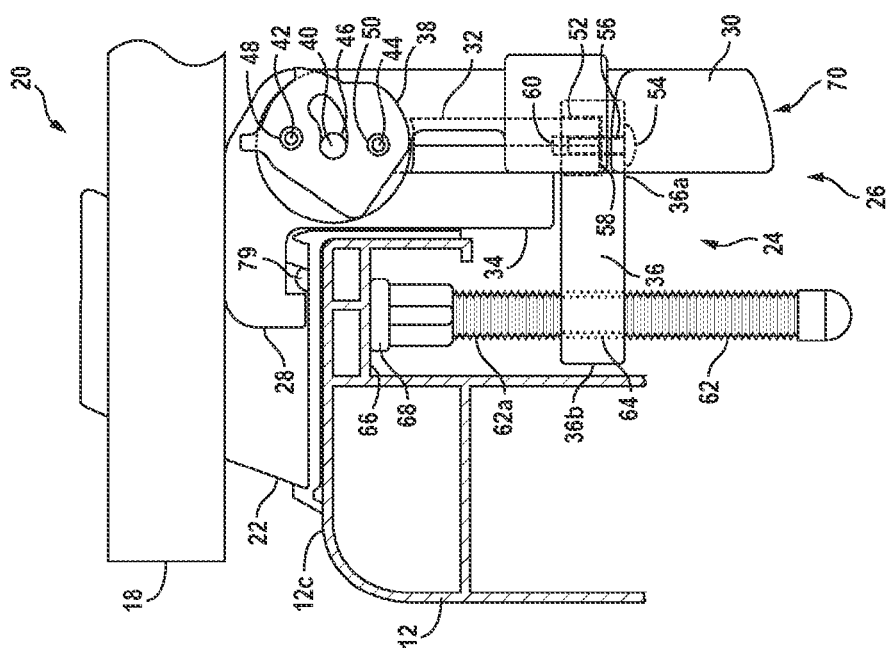

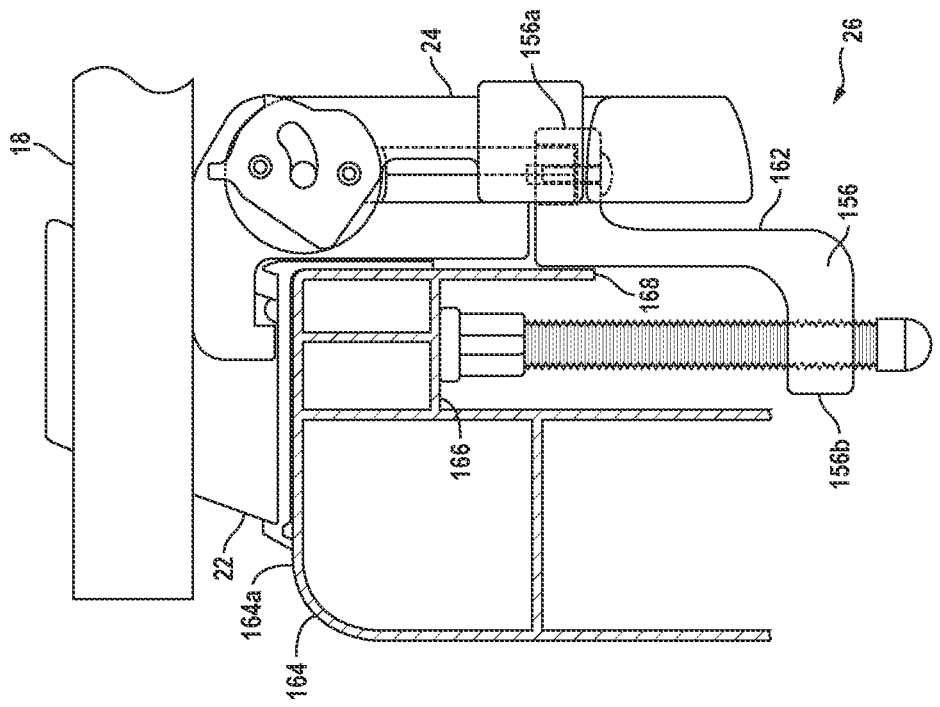
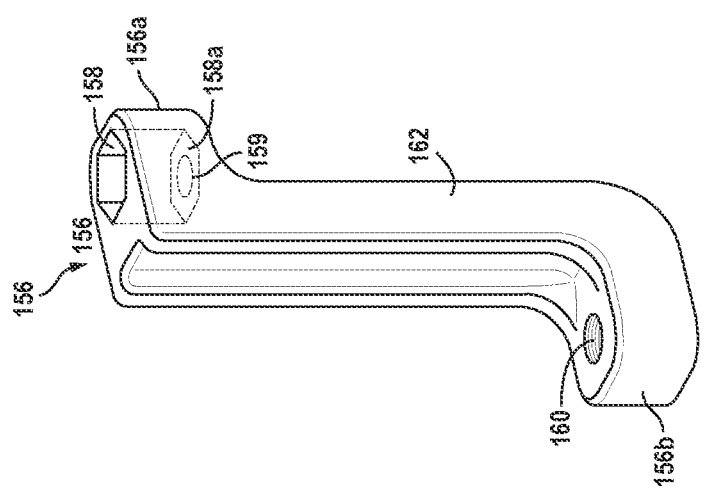
FIG. 5B
FIG. 5A

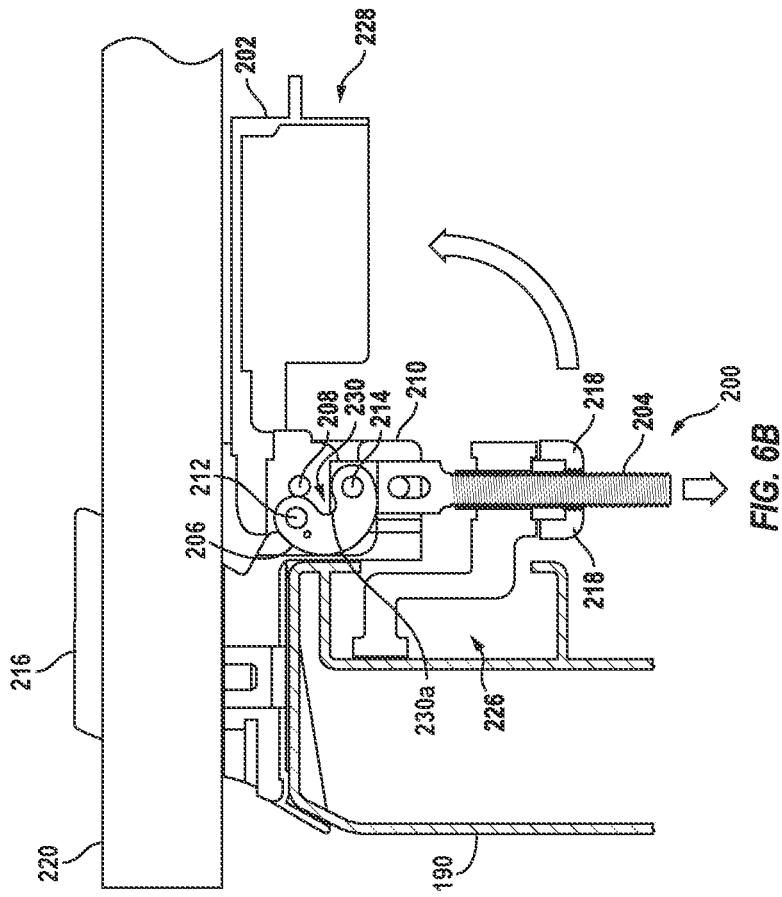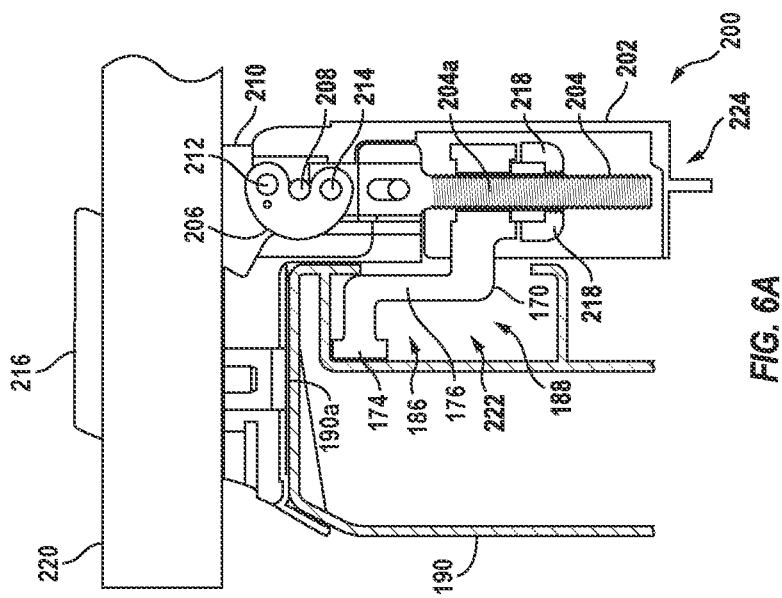

TRUCK CROSSBAR ATTACHMENT

CROSS-REFERENCE TO RELATED APPLICATIONS

This application claims priority under 35 U.S.C. §119(e) to U.S. Provisional Patent Application Ser. No. 61/640,629 which was filed on Apr. 30, 2012. The complete disclosure of the above-identified patent application is hereby incorporated by reference for all purposes.

This application also incorporates herein by reference in their entireties the following U.S. Patent Applications and Patents: U.S. Pat. Nos. 5,431,472; 5,527,024; 6,561,556; 7,014,236; 7,419,075; 7,841,637; 2004/0134953; 2008/0152452; 2009/0026784; and 2010/0072237.

INTRODUCTION

People frequently carry cargo on vehicles. Specialized racks are available for securing recreational items typically on top or on the rear of vehicles. For example, recreational items can be secured on a pair of crossbars on top of a vehicle. Carrying cargo outside the vehicle is a convenient way to increase carrying capacity, particularly considering current trends to drive smaller more fuel efficient vehicles, and particularly with respect to inherently large items that usually don't fit well inside a vehicle, for example, boats, bikes, skis, and surfboards.

Some types of vehicles, such as pickup trucks, have limited roof sizes. This makes attaching crossbars to the roof impractical. These types of vehicles therefore require a way to mount crossbars on another portion of the vehicle, such as above the truck bed. However, options for mounting crossbars to trucks at a level just above the top of the side rails of the truck bed are limited or complex. Often the options require permanently attaching a portion of an apparatus to the side rails. Permanent attachment may limit the flexibility of truck use.

BRIEF DESCRIPTION OF THE DRAWINGS

FIG. 2A is a partial cut-away view of a tower of the crossbar system of FIG. 1 in a clamped position.

FIG. 2B is partial cut-away view of the tower of FIG. 2A in an unclamped position.

FIG. 5A is a perspective view of a second bridge piece.

FIG. 5B is a partial cut-away view of the second bridge piece of FIG. 5A interchangeably coupled to the tower or FIG. 2A.

FIG. 6A is a partial cut-away view of the third bridge piece of FIG. 5C interchangeably coupled in a second orientation to another embodiment of a tower in a clamped position.

FIG. 6B is partial cut-away view of the tower of FIG. 6A in an unclamped position.

DETAILED DESCRIPTION

Figure 1:
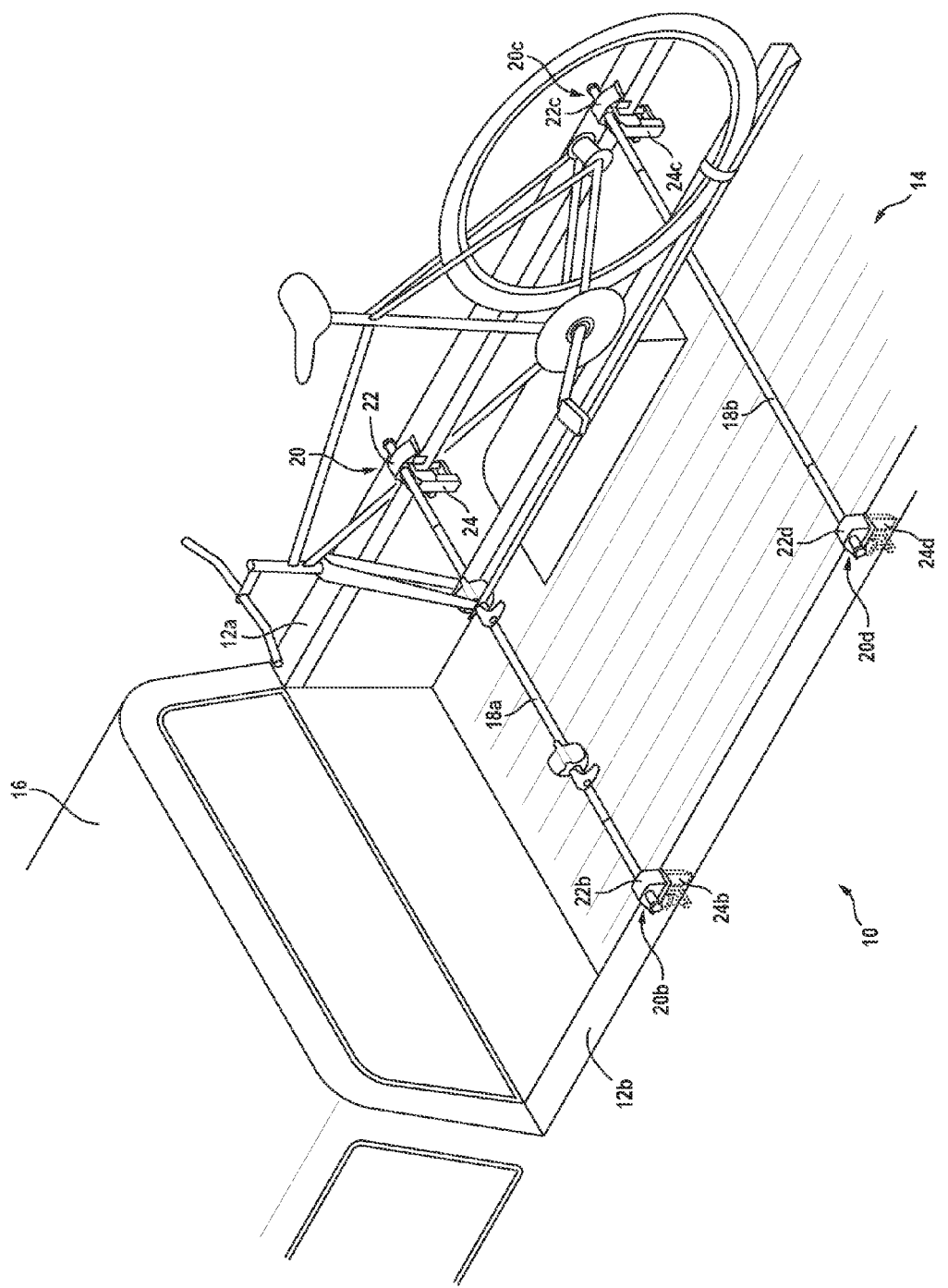
FIG. 1 is a perspective view of a crossbar system according to aspects of the present disclosure.

FIG. 1 shows a crossbar system, generally indicated at 10, which may be configured to be secured to side rails (or walls) 12a, 12b of a truck bed, generally indicated at 14, of a truck 16. Crossbar system 10 may include a pair of crossbars 18a, 18b, and a set of towers (or tower assemblies), generally indicated at 20 and 20b-d. Each tower assembly may include a crossbar housing configured to be secured around a selected location along the crossbar, and a coupling mechanism configured to secure the crossbar housing to truck bed 14. For example, crossbar housing 22 of tower 20 may be secured around a selected location along crossbar 18a, and coupling mechanism 24 of tower 20 may secure crossbar housing 22 to side rail 12a. Crossbar housing 22b of tower 20b may be secured around another selected location along crossbar 18a, and coupling mechanism 24b of tower 20b may secure crossbar housing 22b to side rail 12b. Crossbar housing 22c of tower 20c may be secured around a selected location along crossbar 18b, and coupling mechanism 24c of tower 20c may secure crossbar housing 22c to side rail 12a. Crossbar housing 22d of tower 20d may be secured around another selected location along crossbar 18b, and coupling mechanism 24d of tower 20d may secure crossbar housing 22d to side rail 12b.

FIG. 2A shows a partial cut-away view of tower 20 in a clamped position, generally indicated at 26. Coupling mechanism 24 may include any suitable apparatus configured to secure crossbar housing 22 to a side rail (or wall) 12, shown here as a standard side rail structure. For example, coupling mechanism 24 may include an actuator pivotable around a first axis, and connected to a post (or piston) via a linkage member that may translate pivotal movement of the actuator into linear movement of the post along a second axis which may be perpendicular to the first axis. In some embodiments, coupling mechanism 24 may include a hook member 28, a lever 30, a piston 32, a piston housing 34, a bridge piece 36, a linkage member 38, a first pivot axis 40, a second pivot axis 42, and a third pivot axis 44. Hook member 28 may be configured to removably couple coupling mechanism 24 to crossbar housing 22. Lever 30 may be operatively connected to bridge piece 36 via piston 32.

Lever 30 may be configured to be an over-center lever. For example, lever 30 may be operatively connected to piston 32 by an over-center mechanism including a link and first, second, and third pivot axes, such as linkage member 38, first pivot axis 40, second pivot axis 42, and third pivot axis 44. First pivot axis 40 may be defined by a first bar or axle 46 pivotally connecting lever 30 to piston housing 34. Second pivot axis 42 may be defined by a second bar or axle 48 pivotally connecting lever 30 to linkage member 38. Third pivot axis 44 may be defined by a third bar or axle 50 pivotally connecting piston 32 to linkage member 38. As indicated, piston 32 may be inserted into a recess 52 disposed in a first end portion 36a of bridge piece 36.

A bolt 54 may be inserted through an aperture 56 extending though a floor surface 58 of recess 52, and threaded into an aperture 60 disposed in piston 32, which may provide for bridge piece 36 to be interchangeably coupled to coupling mechanism 24 and for adjusting displacement of bridge piece 36 from a crossbar 18 and/or hook member 28.

Bridge piece 36 may include a post 62 adapted to contact a substantially horizontal surface 66 of side rail 12 when in clamped position 26. For example, post 62 may be threaded through a threaded aperture 64 in a second end 36b of bridge piece 36. Second end portion 36b may be adapted to extend under substantially horizontal surface 66 of side rail 12. Post 62 may include a clamping seat 68 connected to an end portion 62a of post 62 distal second end portion 36b of bridge piece 36.

When in clamped position 26, first end portion 36a and second end portion 36b of bridge piece 36 may be substantially equidistant, or substantially vertically equidistant, from crossbar 18 and/or hook member 28.

Lever 30 may be operable between a closed position 70 and an open position 72 (see FIG. 2B). Closed position 70 may correspond to clamped position 26 of bridge piece 36 which clamps side rail 12 between bridge piece 36 and the crossbar housing 22.

FIG. 2B shows a partial cut-away view of tower 20 in an unclamped position 74. As shown, unclamped position 74 corresponds to open position 72 of lever 30. As indicated, bridge piece 36 may be moveable up and down between clamped position 26 and unclamped position 74, and lever 30 may be operable between open position 72 and closed position 70. Movement of lever 30 from open position 72 to closed position 70 may cause upward movement of bridge piece 36 from unclamped position 74 to clamped position 26. Movement of lever 30 from closed position 70 to open position 72 may cause downward movement of bridge piece 36 from clamped position 26 to unclamped position 74.

For example, pivotation of lever 30 about first pivot axis 40 towards open position 72 may cause arcuate rotation of second pivot axis 42 about first pivot axis 40, increase displacement between third pivot axis 44 and first pivot axis 40, and cause linear movement of piston 32 along a fourth axis to move bridge piece 36 towards unclamped position 74. The linear movement of piston 32 may be perpendicular to first pivot axis 40.

To return coupling mechanism 24 to clamped position 26, lever 30 may be pivoted about first pivot axis 40 towards closed position 70, which may cause arcuate rotation of second pivot axis 42 about first pivot axis 40 and may in turn decrease displacement between third pivot axis 44 and first pivot axis 40 to move bridge piece 36 towards clamped position 26.

When in unclamped position 74, a vertical displacement of post 62 from surface 66 may be adjusted by turning post 62 in threaded aperture 64.

When in unclamped position 74, hook member 28 may be uncoupled from crossbar housing 20 and coupling mechanism 24 may be removed from both coupling mechanism 20 and side rail 12, which may allow a user to secure and unsecure crossbar system 10 to a truck without the use of tools.

As shown in FIG. 2B, an edge 38a of linkage member 38 may be seated against a surface 32a of piston 32 when lever 30 is in open position 72, which may provide feedback to the user that lever 30 has been pivoted to open position 72.

As shown in FIGS. 2A and 2B, linkage member 38 may include a recess 76 having a first end 76a and a second end 76b. Pivotation of lever 30 may cause relative movement of first pivot axis 40 in recess 76, such that when lever 30 is in closed position 70 (see FIG. 2A) first pivot axis 40 may be proximal first end 76a of recess 76, and when lever 30 is in open position 72 (see FIG. 2B) first pivot axis 40 may be distal first end 76a and proximal second end 76b of recess 76. First end 76a and second end 76b may provide maximum pivotation feedback regarding linkage member 38 through lever 30 to the user, and may also limit pivotation of lever 30 and displacement of bridge piece 36 from side rail 12.

First pivot axis 40 and third pivot axis 44 may be vertically aligned in a common plane in both open position 72 and closed position 70 of lever 30. First pivot axis 40 may be substantially between second pivot axis 42 and third axis 44 when lever 30 is in closed position 70. An end view of an orientation of first pivot axis 40, second pivot axis 42, and third pivot axis 44 may substantially approximate a right-angled triangle when lever 30 is in open position 72.

Coupling mechanism 24 may include any suitable apparatus configured to removably engage crossbar housing 22. For example, crossbar housing 22 may have a ledge portion 79 configured to sit on an upper surface 12c of side rail 12, and hook member 28 of coupling mechanism 24 may be configured to removably engage ledge portion 79. Bridge piece 36 may be moveable up and down relative to hook member 28, between clamped position 26 and unclamped position 74.

Figure 3:
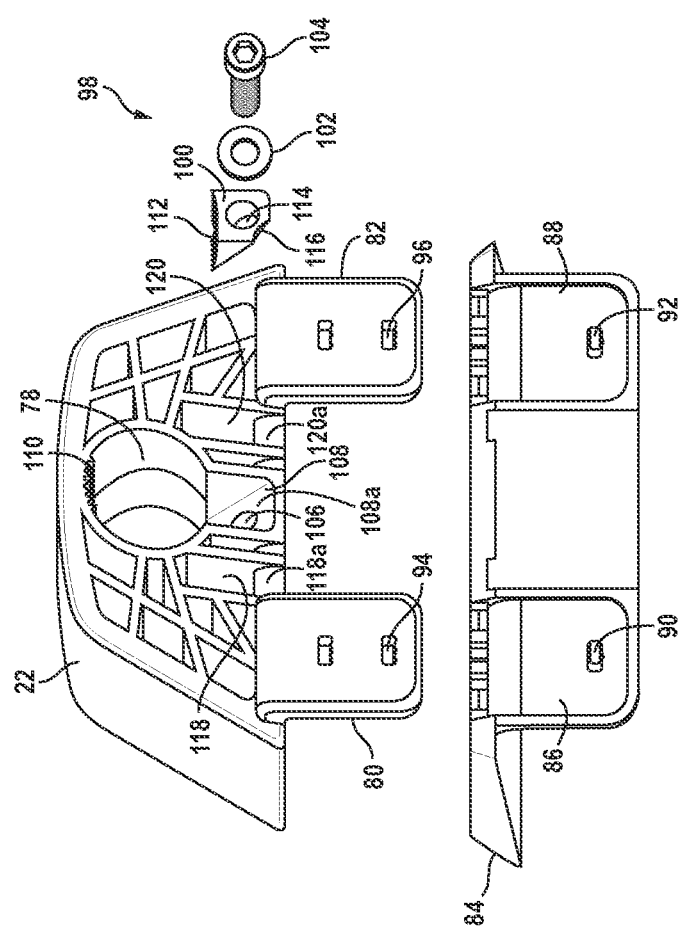
FIG. 3 is a perspective view of a crossbar housing.

FIG. 3 shows a perspective view of crossbar housing 22, which may be configured to sit on an upper surface of a truck bed wall (or side rail) and be secured around a selected location along a crossbar. For example, crossbar housing 22 may include an aperture 78 for receiving a crossbar, such as crossbar 18, and first and second tabs 80, 82 that may seat against a surface of a side rail inside a truck bed.

A pad 84 may be disposed between crossbar housing 22 and a side rail of a truck bed, which may protect the side rail from being scratched or otherwise damaged by crossbar system 10. Pad 84 may be disposed between aperture 78 and a substantially horizontal surface of the side rail, and between first and second tabs 80, 82 and a substantially vertical outside surface of the side rail inside the truck bed. Pad 84 may include first and second recesses 86, 88 and first and second protrusions 90, 92 for respectively receiving and securing first and second tabs 80, 82 having first and second apertures 94, 96. For example, when crossbar housing 22 is seated on the side rail, first and second apertures 94, 96 may respectively receive protrusions 90, 92. Alternatively, first and second recesses 86, 88 may have apertures, and first and second tabs 80, 82 may have protrusions.

Crossbar housing 22 may include a clamp device 98 for securing aperture 78 around a selected location along a crossbar, such as crossbar 18. Clamp device 98 may include a wedge 100, a washer 102, a screw 104, and an aperture 106 disposed in a wedge recess 108. Wedge recess 108 may be disposed in crossbar housing 22 along an edge portion of aperture 78.

Aperture 78 may be roundly dimensioned to receive a round crossbar, and may have grooves 110 that may be parallel to a core axis of the crossbar. However, aperture 78 may be dimensioned to receive any suitable crossbar, such as a square crossbar, an oval crossbar, or a tear-shaped crossbar, and may have grooves similar to or different than grooves 110 to reduce movement of any suitable crossbar in aperture 78.

Wedge recess 108 may be dimensioned to receive wedge 100. Screw 104 may be inserted through washer 102 and an aperture 114 disposed through wedge 100. Screw 104 may then be threaded into aperture 106 of wedge recess 108. Actuation of screw 104 may cause crossbar housing 22 to be secured around a selected location along the crossbar. For example, wedge 100 may press the crossbar against a sidewall of aperture 78 and/or between grooves 110 and wedge grooves 112. Wedge 100 may have wedge grooves 112 that are perpendicular to the core axis of the crossbar. Grooves 110 may provide an increased tangential frictional force on the crossbar to hinder the crossbar from twisting in aperture 78, and wedge grooves 112 may provide an increased longitudinal frictional force on the crossbar to hinder the crossbar from translating in aperture 78.

Wedge 100 may be made of a compressible material, such as rubber, and may have a cut-out, such as cut-out 116, which may allow wedge 100 to twist towards the crossbar as wedge 100 is compressed by actuation of screw 104. Cut-out 116 may also help wedge 100 to slide up a rear inclined surface 108*a* of recess 108. For example, screw 104 may exert a clockwise angular force on wedge 100, and cut-out 116 may reduce a frictional force between wedge 100 and recess 108 caused by the clockwise angular force.

First and second slots 118 and 120 may be disposed in crossbar housing 22 and may each be dimensioned to receive and secure a hook member over respective ledge portions 118*a* and 120*a*. The hook member may removably couple coupling mechanism 24 to the one or more slots in crossbar housing 22. Alternatively, crossbar housing 22 may include one or more hook members, and one or more slots may be disposed in coupling mechanism 24.

Figure 4:
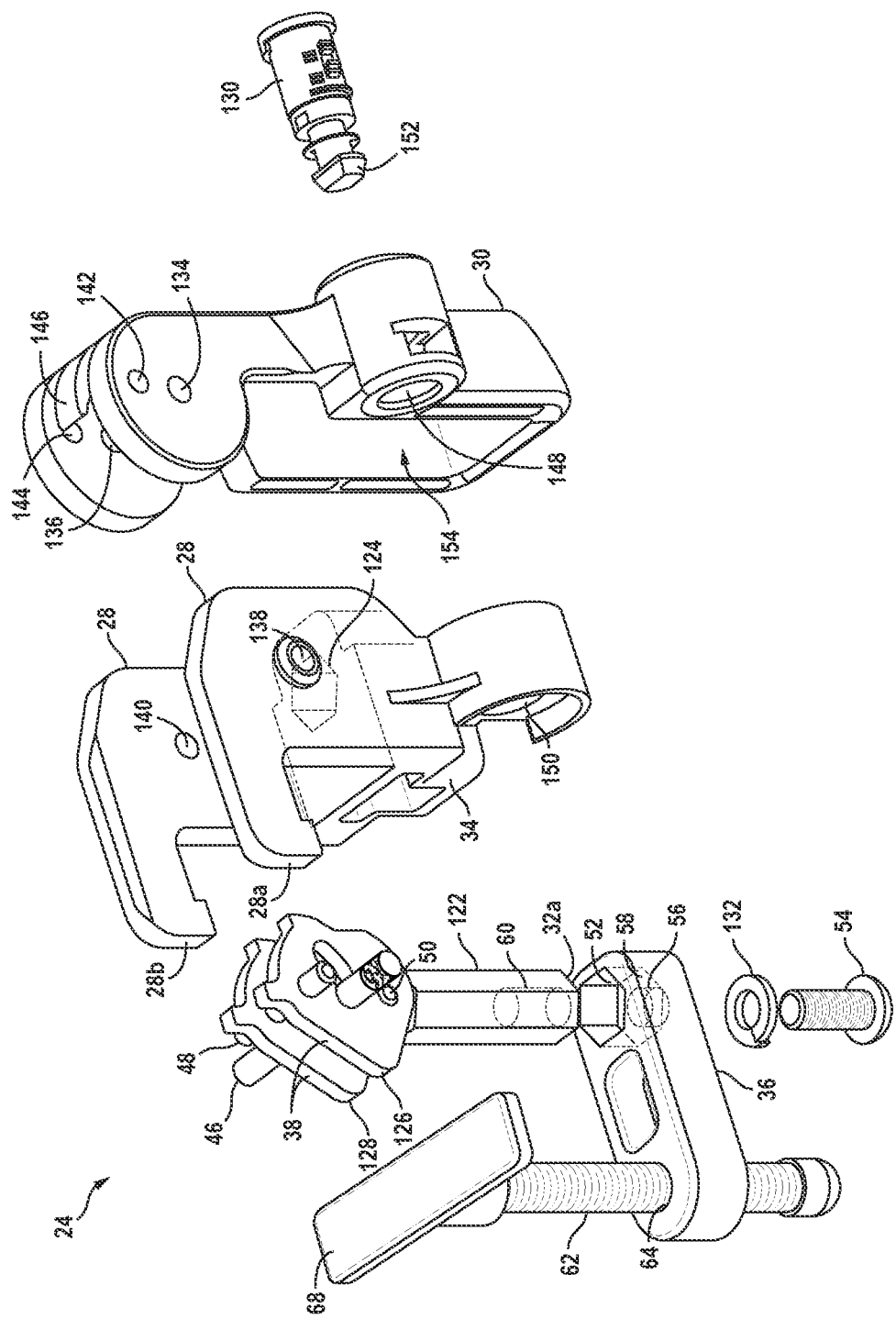
FIG. 4 is an exploded view of a coupling mechanism of the tower of FIGS. 2A and 2B.

FIG. 4 is a partial exploded view of coupling mechanism 24 showing piston 32 as including a polygonal bar 122; piston housing 34 as including a polygonal (or non-circular) aperture 124; recess 52 of bridge piece 36 as being a polygonal shaped recess; linkage member 38 as including a first link member 126 and a second link member 128; and lever 30 as including a locking mechanism 130.

Piston 32 may be moveable in piston housing 34, for example in polygonal aperture 124 (shown in phantom). Aperture 124 may be dimensioned to receive piston 32 and prevent piston 32 from twisting as piston 32 moves up and down inside aperture 124.

As shown in FIG. 4, hook member 28 may be connected to piston housing 34. Hook member 28 may include a first hook 28*a* and a second hook 28*b*, which may be adapted to be respectively inserted into first and second slots 118, 120 and secured over respective ledge portions 118*a*, 120*a* of crossbar housing 22 (see FIG. 3).

Bridge piece 36 may be removably and/or interchangeably coupled to piston 32 by insertion of a protrusion, such as a polygonal protrusion 32*a* of piston 32, into a recess, such as recess 52 in bridge piece 36. The recess may be non-circularly dimensioned to prevent the protrusion from twisting in the recess. Alternatively, the protrusion may be connected to bridge piece 36 and the recess may be formed in piston 32. As shown, polygonal protrusion 32*a* and recess 52 are hexagonally shaped.

As described above in the description of FIG. 2A, bolt 54 may be inserted through a washer 132 and aperture 56 extending though floor portion 58 of recess 52. Bolt 54 may then be threaded into aperture 60 disposed in piston 32, which may provide for bridge piece 36 to be interchangeably coupled to coupling mechanism 24 and for adjusting a displacement of bridge piece 36 from the crossbar.

As shown in FIG. 4, third bar 50 may be shorter than first bar 46 and second bar 48, and second bar 48 may be shorter than first bar 46. First bar 46 may extend through first and second link members 126, 128 in respective link recesses, and through apertures 134, 136 in lever 30 and apertures 138, 140 in piston housing 34. Second bar 46 may extend through first and second link members 126, 128 and apertures 142, 144 of lever 30. Third bar 50 may extend through an aperture (not shown) in piston 32 and first and second link members 126 and 128. Alternatively, third bar 50 may be formed in piston 32.

A portion 146 of lever 30 may be seated against second bar 48, which may provide leverage to lever 30 as lever 30 pushes against second bar 48 and is pivoted to open position 72 (see FIG. 2B). Portion 146 may prevent access to screw 104 (see FIG. 3) when coupling mechanism 24 is in clamped position 26 (see FIG. 2A), which may prevent a thief from removing the crossbar from crossbar housing 22.

Locking mechanism 130 may extend through an aperture 148 in lever 30 and through an aperture 150 in piston housing 34. Actuation of locking mechanism 130 in closed position 70 (see FIG. 2A) may secure an end piece 152 of locking mechanism 130 to aperture 150, thus locking lever 30 in closed position 70. A recess or cavity 154 in lever 30 may cover piston 32 and prevent access to bolt 54 when lever 30 is locked in closed position 70, which may prevent a thief from removing coupling mechanism 24. For example, when lever 30 is in open position 72, bolt 54 may be accessible to the user, and when lever 30 is locked in closed position 70, bolt 54 may be inaccessible to the user.

FIG. 5A shows a perspective view of a second bridge piece 156, which may be interchangeably coupled to coupling mechanism 24. For example, the user may remove bridge piece 36 from piston 32 and couple second bridge piece 156 to piston 32 in place of bridge piece 36.

Second bridge piece 156 may have a first end portion 156*a* configured to be removably coupled to piston 32. For example, second bridge piece 156 may include a recess 158 disposed in first end portion 156*a*, a threaded aperture 160 disposed in a second end portion 156*b* for receiving a post similar to post 62 (see FIG. 2A), and an extension portion 162 extending substantially vertically between first and second end portions 156*a*, 156*b*. Recess 158 may be configured similarly to recess 52 of bridge piece 36, so that second bridge piece 156 may be similarly interchangeably coupled to piston 32. For example, recess 158 may have an aperture 159 extending through a floor surface 158*a* of recess 158. Recess 158 and the aperture 159 may be dimensioned to receive an end of bolt 54 and secure second bridge piece 156 to piston 32 by threading bolt 54 into aperture 60 in piston 32.

FIG. 5B shows a partial cut-away view of second bridge piece 156 interchangeably coupled to coupling mechanism 24. As shown, extension portion 162 of second bridge piece 156 may allow coupling mechanism 24 to secure crossbar housing 22 to a truck bed with a standard side rail, such as side rail 164, having a lower horizontal surface, such as surface 166, and/or a lower extending front face, such as front face 168. For example, extension portion 162 may be configured such that second end portion 156*b* is further from hook member 28, a top surface 164*a* of side rail 164, and/or crossbar 18 than first end portion 156*a* is from hook member 28, top surface 164*a*, and/or crossbar 18. Second end portion 156*b* may be adapted to extend under surface 166 when coupling mechanism 24 is in clamped position 26.

Figure 5D:
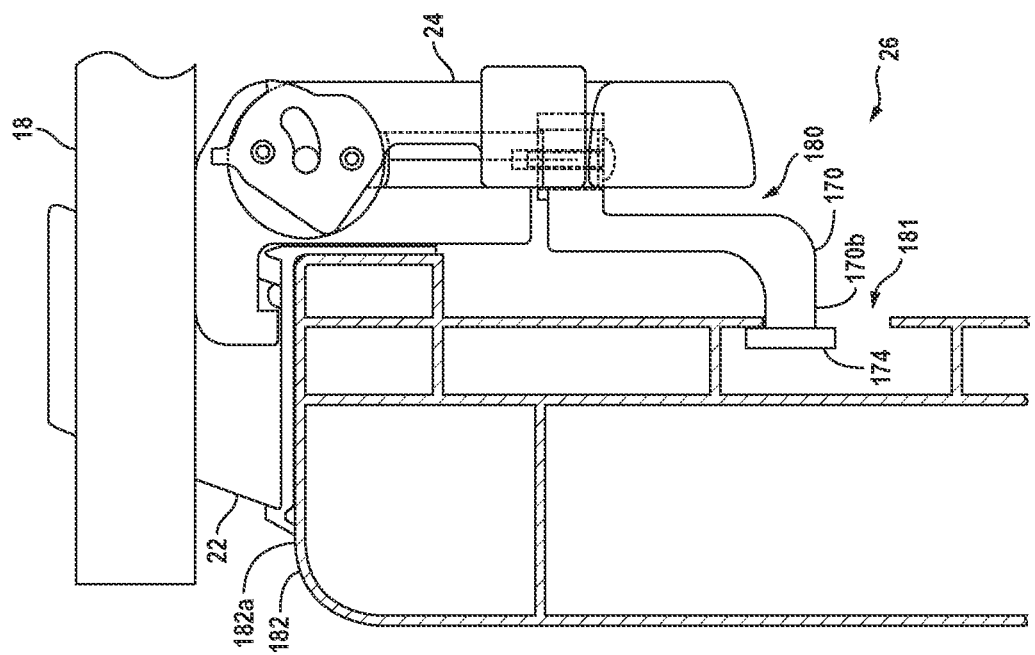
FIG. 5D is a partial cut-away view of the third bridge piece of FIG. 5C interchangeably coupled in a first orientation to the tower or FIG. 2A.
Figure 5C:
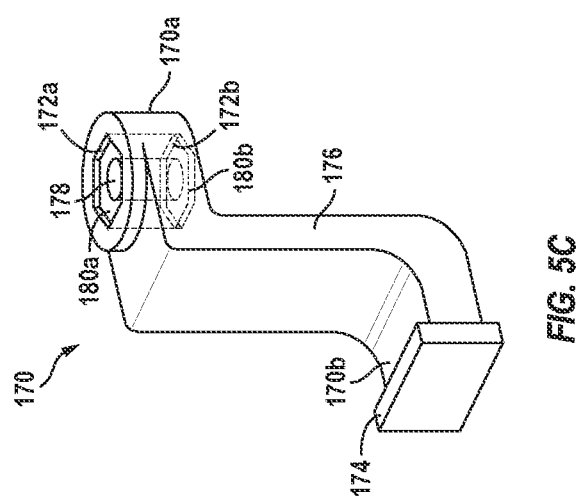
FIG. 5C is a perspective view of a third bridge piece adapted to secure the crossbar system of FIG. 1 to a c-channel truck bed side rail.

FIG. 5C shows a perspective view of a third bridge piece 170, which may be interchangeably coupled to coupling mechanism 24. For example, the user may remove bridge piece 36 or second bridge piece 156 from piston 32 and couple third bridge piece 170 to piston 32.

Third bridge piece 170 may allow coupling mechanism 24 to engage a c-channel truck bed rail structure, and may be configured to be reversibly interchangeably coupled to coupling mechanism 24. For example, third bridge piece 170 may include first and second recess 172*a*, 172*b* disposed on opposite sides of a first end portion 170*a*, a flange 174 connected to a second end portion 170*b* for engaging a c-channel truck bed rail structure, and an extension portion 176 extending substantially vertically between first and second end portions 170*a*, 170*b*.

Recesses 172*a*, 172*b* may be configured similarly to recess 52 of bridge piece 36, so that third bridge piece 170 may be similarly interchangeably coupled to piston 32, in a first orientation with piston 32 inserted into recess 172*a* and a second orientation with piston 32 inserted into recess 172*b*, thus allowing third bridge piece 170 to be reversibly interchangeably coupled to piston 32. For example, first end portion 170*a* may have an aperture 178 extending through respective floor surfaces 180a, 180b of recesses 172a, 172b. Recesses 172a, 172b and aperture 178 may be dimensioned to receive an end of bolt 54 and secure third bridge piece 170 to piston 32 by threading bolt 54 into aperture 60 in piston 32.

FIG. 5D shows a partial cut-away view of third bridge piece 170 interchangeably coupled to coupling mechanism 24 in a first orientation 180. As indictated, flange 174 of third bridge piece 170 may be configured to allow coupling mechanism 24 to secure crossbar housing 22 to a truck bed with a c-channel side rail, such as to a c-channel 181 of a side rail 182. For example, second end portion 170b may be adapted to extend into c-channel 181, and flange 174 may be adapted to contact an inside surface of c-channel 181 when coupling mechanism 24 is in clamped position 26.

FIG. 6A shows a partial cut-way view of third bridge piece 170 interchangeably coupled in a second orientation 186 to another embodiment of a coupling mechanism, generally indicated at 200. In second orientation 186, extension portion 176 may be configured to allow flange 174 to contact an inside surface of a c-channel, such as c-channel 188 of a side rail 190. As shown, c-channel 188 is positioned closer to a top surface 190a of side rail 190 and/or crossbar 220 than c-channel 181 is to top surface 182a of side rail 182 and/or crossbar 18 (see FIG. 5D), and as such, the reversibility of third bridge piece 170, along with the interchangeability of bridge piece 36 and second and third bridge pieces 156, 170 may allow crossbar system 10 to be used with a wide range of side rail structures.

A crossbar housing 216 may be configured to be secured around a selected location along crossbar 220, and coupling mechanism 200 may be configured to couple crossbar housing 216 to side rail 190. For example, coupling mechanism 200 may include a lever 202 operatively connected to a piston 204 via a linkage member 206. A first pivot axis 208 may pivotally connect lever 202 to a piston housing 210; a second pivot axis 212 may pivotally connect lever 202 to linkage member 206; and a third pivot axis 214 may pivotally connect linkage member 206 to piston 204. Piston housing 210 may include a hook member (not shown) configured to removably engage a ledge portion (not shown) in crossbar housing 216.

Piston 204 may include a threaded portion 204a sized to be received by any of apertures 56, 158, or 178 of respective bridge piece 36, second bridge piece 156, or third bridge piece 170. A threaded thumbscrew 218 (shown in cross-section) may adjustably secure bridge piece 36, second bridge piece 156, or third bridge piece 170 to coupling mechanism 204, allowing the user to adjust displacement of a bridge piece from a crossbar 220 along piston 204.

FIG. 6A shows coupling mechanism 200 in a clamped position 222, which may correspond to a closed position 224 of lever 202. FIG. 6B shows coupling mechanism 200 in an unclamped position 226, which may correspond to an open position 228 of lever 202. As indicated by the arrows, a bridge piece, such as third bridge piece 170, may be moveable up and down between clamped position 222 and unclamped position 226, and lever 202 may be operable between open position 228 and closed position 224 (see FIG. 6A). Movement of lever 202 from open position 228 to dosed position 224 may cause upward movement of the bridge piece, such as third bridge piece 170, from unclamped position 226 to clamped position 222. Movement of lever 202 from dosed position 224 to open position 228 may cause downward movement of the bridge piece, such as third bridge piece 170, from clamped position 222 to unclamped position 226. For example, pivotation of lever 202 about first pivot axis 208 towards open position 228 may cause arcuate rotation of second pivot axis 212 about first pivot axis 208 and may increase displacement between third pivot axis 214 and first pivot axis 208 to move the bridge piece, such as third bridge piece 170, towards unclamped position 226. To return coupling mechanism 200 to clamped position 222, lever 202 may be pivoted about first pivot axis 208 towards closed position 224, which may cause arcuate rotation of second pivot axis 212 about first pivot axis 208, and may in turn decrease displacement between third pivot axis 214 and first pivot axis 208 to move the bridge piece, such as third bridge piece 170, towards clamped position 222.

When in unclamped position 226, the hook member (not shown) of coupling mechanism 200 may be uncoupled from crossbar housing 216 and coupling mechanism 200 may be removed from both crossbar housing 216 and side rail 190, which may allow the user to secure and unsecure the crossbar system to a truck without the use of tools.

As shown in FIGS. 6A and 6B, linkage member 206 may include a recess 230 having a first end 230a. Pivotation of lever 202 may cause relative movement of first pivot axis 208 in recess 230, such that when lever 202 is in closed position 224 first pivot axis 208 may be proximal first end 230a of recess 230, and when lever 202 is in open position 228 first pivot axis 208 may be distal first end 230a of recess 230. First end 230a may provide maximum pivotation feedback regarding linkage member 206 through lever 202 to the user, and may also limit pivotation of lever 202 towards closed position 224 and displacement of the bridge piece, such as third bridge piece 170 from crossbar 220.

As also shown in FIGS. 6A and 6B, first pivot axis 208 and third pivot axis 214 may be vertically aligned in a common plane in both open position 228 and closed position 224 of lever 202. First pivot axis 208 may be substantially between second pivot axis 212 and third axis 214 when lever 202 is in closed position 224. As shown, an end view of an orientation of first pivot axis 208, second pivot axis 212, and third pivot axis 214 may substantially approximate a right-angled triangle when lever 202 is in open position 228.

Preferably, bridge piece 36, second bridge piece 156, and/or third bridge piece 170 may comprise a set of interchangeable and/or alternate bridges included in crossbar system 10. Each of the bridge pieces may be configured to engage a different truck bed rail structure. Each bridge piece, once incorporated into the coupling mechanism, such as coupling mechanism 24 or coupling mechanism 200, may be moveable up and down between a clamped position and an unclamped position.

Figure 7:
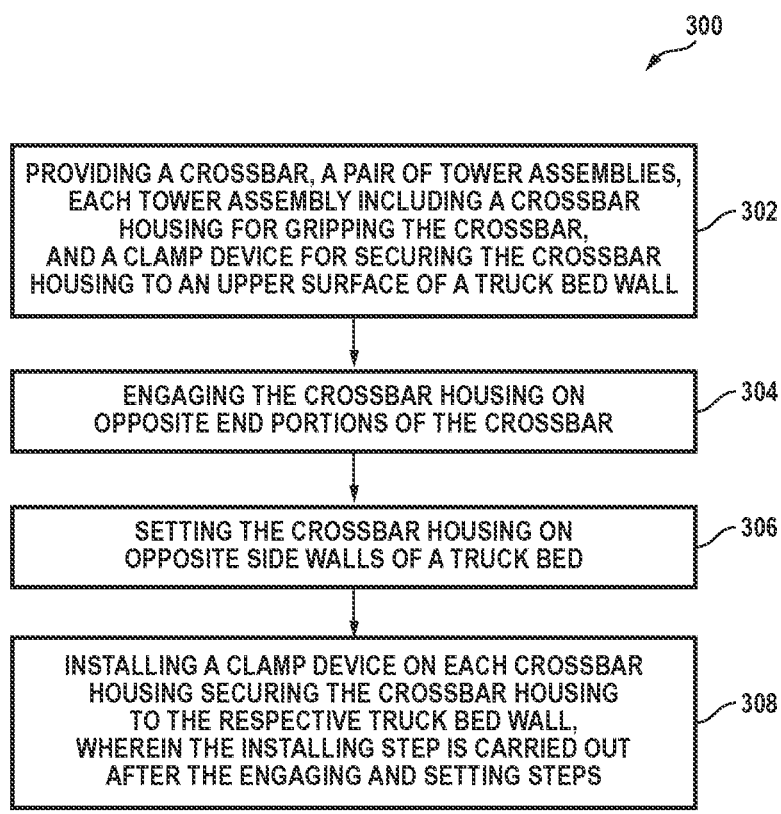
FIG. 7 is a flowchart depicting an illustrative method of mounting a crossbar system on a truck bed.

FIG. 7 is a flowchart depicting an illustrative method 300 of mounting a crossbar system on a truck bed.

A step 302 of method 300 may include providing a crossbar and a pair of tower assemblies. Each tower assembly may include a crossbar housing for gripping the crossbar, and a clamp device for securing the crossbar housing to an upper surface of a truck bed wall.

A step 304 of method 300 may include engaging the crossbar housings on opposite end portions of the crossbar.

A step 306 of method 300 may include setting the crossbar housings on opposite side walls of a truck bed.

A step 308 of method 300 may include installing a clamp device on each crossbar housing, which may secure the crossbar housing to the respective truck bed wall. Step 308 may be carried out after steps 304 and 306 (i.e., the installing step may be carried out after the engaging and setting steps). Installing the clamp device on each crossbar housing may include coupling a first bridge piece to each clamp device.

Method 300 may include uninstalling the clamp device from each crossbar housing, which may unsecure the crossbar housing from the respective truck bed wall; removing the crossbar housings from the truck bed; uncoupling the first bridge piece from each clamp device; coupling a second bridge piece to each clamp device, wherein the second bridge piece may be configured to secure the clamp device to a second truck bed having a different side wall structure; setting the crossbar housings on opposite side walls of the second truck bed; and installing the clamp device with the second bridge piece on each crossbar housing, which may secure the crossbar housing to the respective second truck bed wall.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A crossbar system for a truck bed, comprising:
a crossbar;
two towers, each tower coupling an end portion of a crossbar to a truck bed, each tower including:
a crossbar housing including a clamp device for securing the crossbar housing around a selected location along the crossbar, and
a coupling mechanism configured to secure the crossbar housing to the truck bed, including a plurality of alternate bridge pieces, each bridge piece being configured to engage a different truck bed rail structure, wherein each bridge piece, once incorporated in the coupling mechanism, is moveable up and down between a clamped position and an unclamped position, the coupling mechanism further including an actuator pivotable around a first axis, and connected to a post via a linkage member that translates pivotal movement of the actuator into linear movement of the post along a second axis which is perpendicular to the first axis, wherein each bridge piece, once incorporated in the coupling mechanism, is removably coupled to the post, wherein at least one bridge piece of the plurality of bridge pieces has a first end portion configured to be removably coupled to the post, and a second end portion configured to engage a standard truck bed rail structure with a second post adjustably threaded through an a threaded aperture disposed in the second end portion.

2. The crossbar system of claim 1, wherein at least one bridge piece of the plurality of bridge pieces has a first end portion configured to be removably coupled to the post, and a second end portion configured to engage a c-channel truck bed rail structure.

3. The crossbar system of claim 1, wherein the first end portion and the second end portion of at least one bridge piece of the plurality of bridge pieces are substantially equidistant from the crossbar when in the clamped position.

4. The crossbar system of claim 1, wherein the at least one bridge piece of the plurality of bridge pieces has a substantially vertically extending extension portion between the first end portion and the second end portion, such that the second end portion is substantially further from the crossbar than the first end portion when in the clamped position.

5. The crossbar system of claim 1, wherein the crossbar housing has a ledge portion configured to sit on an upper surface of a truck bed wall, and the coupling mechanism includes a hook member configured to removably engage the ledge portion of the housing.

* * * * *